May 17, 1966  R. D. KRUPNICK  3,251,985
ILLUMINATION EFFECT LIGHT
Filed Sept. 30, 1963

INVENTOR.
ROBERT D. KRUPNICK
BY *Harry R. Lubcke*
AGENT

Patented May 17, 1966

3,251,985
ILLUMINATION EFFECT LIGHT
Robert D. Krupnick, 1775 N. Crescent Heights Blvd.,
Los Angeles, Calif.
Filed Sept. 30, 1963, Ser. No. 312,386
4 Claims. (Cl. 240—2)

My invention relates to means for illuminating subject matter that is to be enhanced by specifically controlled and directed light.

Particularly in illuminating works of art, such as paintings, tapestries and murals, artistic effects which transcendw hat the artist can accomplish with pigments alone can be provided with specifically controlled and directed light. This advantage has either been closed to the prior art, or a relatively cumbersome and unsightly assemblage of illuminating devices has been placed in full view of those viewing the works of art. Neither of these extremes are aesthetically or artistically satisfactory.

I am able to fill this need by employing a plurality of small lighting units which are correlated and integrated into a pleasing whole and which have specific means for controlling and directing light. The specific means are selectable to most accurately meet the requirements of the particular part of the artistic subject matter to be illuminated.

An object of my invention is to provide small and integrated means to furnish specifically controlled and directed illumination for pictorial subject matter.

Another object is to provide integrated multiple such means.

Another object is to provide a novel enclosure for such multiple means.

Another object is to provide substitutional means for vignetting specific light beams.

Another object is to provide means for color-tinting specific light beams.

Other objects will become apparent upon reading the following detailed specification and upon examining the accompanying drawings, in which are set forth by way of illustration and example certain embodiments of my invention.

Figure 1:
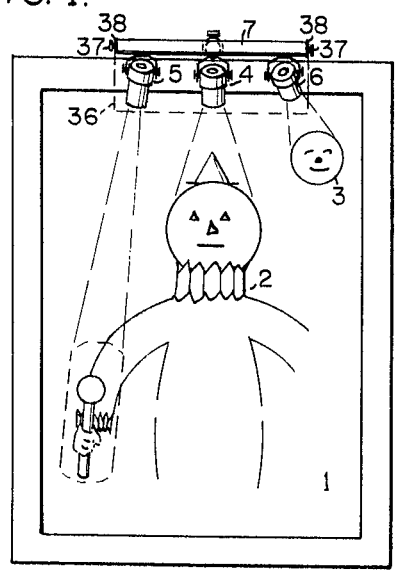
Figure 2:
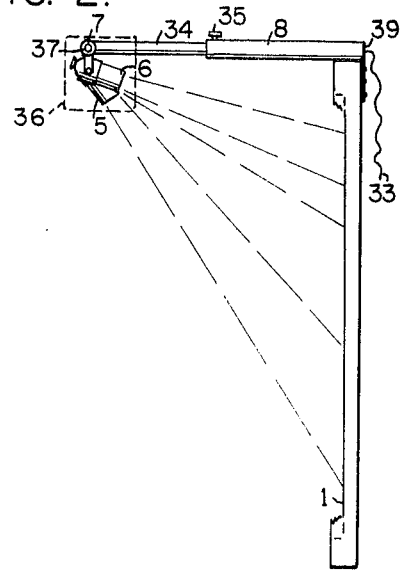
Figure 3:
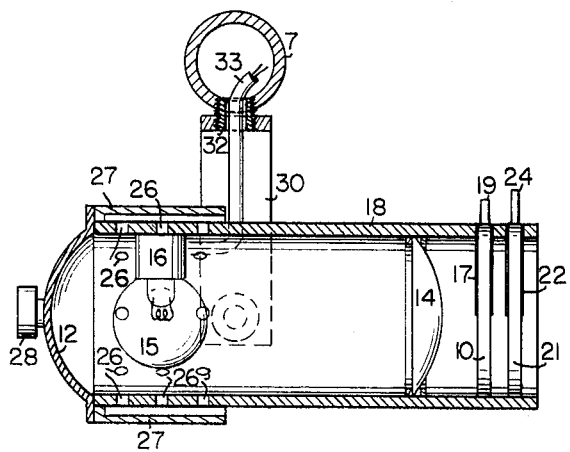
Figure 4:
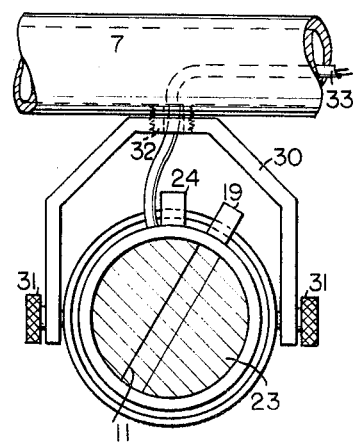

FIG. 1 is a front elevation view of my illumination effect light in use, providing accent illumination for a painting, FIG. 2 is a side elevation view of the same, FIG. 3 is a sectional elevation view of an effects light unit, and FIG. 4 is an end elevation view of the same.

In FIG. 1 numeral 1 indicates a painting, say of a clown 2 and with a moon 3 also in the picture. In addition to the usual ambient illumination in the room it is desired to emphasize certain aspects of the painting for artistic and/or dramatic effects. In this example these aspects are the face, an arm, hand and what the hand contains, and the moon.

Such accent illumination is accomplished by a three-unit effects light according to my invention, having units 4, 5, and 6. These are supported by bar 7 and extension bracket 8. (See FIGS. 1 and 2.) Each unit light is directed toward one aspect to be enhanced and is provided with an effects pattern element to accomplish vignetting; that is, to restrict the beam of light from a unit to a predetermined size and shape for accomplishing the emphasis desired. This calls for an effects pattern having a round aperture of a size to provide the desired area of illumination at the distance between the face and the unit. Unit 5 illuminates the clown's arm, hand and what he has in his hand. This calls for an elongated effects pattern, as pattern 10, having a slit aperture 11, as may be seen in FIG. 4. It will be noted that aperture 11 is at an angle to the vertical, which is required for the arm, etc.

illumination and which may be adjusted as to the angle to the vertical, as will be later set forth. Light unit 6 emphasizes moon 3 by illumination in a similar manner to the emphasis for the face.

It will be noted in FIG. 3 that the effects patterns 10 are located out of the focal plane of the optical system of the unit, which system includes light source 15, reflector 12 and lens 14. Thus, the edges of the light patterns upon the painting are not sharp, but blend off in intensity in a pleasing manner in accordance with vignetting practice. The light pattern must emphasize pictorial subject matter, but it must not call attention to itself.

The light units in themselves are very small, typically only 1½" diameter. Consequently, they appear less obtrusive than any assemblage of lights known to the prior art; as, for example, the theatrical lighting art, even including the known "baby" spots.

In FIG. 3 incandescent lamp 15 is typically a commercially available spherical-shaped lamp of the order of 50 watts electrical rating at 110 volts. This is operated at or slightly above its rated voltage in order to obtain high luminous efficiency. The lamp is held in socket 16, which is typically of the bayonet type. The light from the lamp is reflected by spun and polished aluminum reflector 12 and is formed into a beam by plano-convex lens 14.

While the optical system of the lighting unit has a determining effect upon the light beam, the size and shape of the area illuminated is more specifically determined by the size and shape of aperture 11 in effects pattern 10. In FIG. 4 this is shown as a slit and in the present application this pattern is employed for the arm, hand, object sequence of the clown. It is to be understood, however, that other shapes are used for other areas in this picture and that in practice a whole series of effect shapes are provided. A round aperture is employed in lighting unit 4 to emphasize the face and another and smaller aperture in unit 6 to emphasize the moon. As an example, a circular aperture ⅛" diameter produces a light pattern 9" in diameter at a distance of two feet from the lighting unit. Other, normally larger apertures have triangular, square, elliptical and even irregular shapes. These are selectively employable to produce the effects desired in practice. Each is employed by sliding it into the rearward, 17, of two semicircular slots milled in body 18. Allowance for circumferential orientation of the pattern is provided by making slot 17 extend downward into the body for approximately 180°. This allows a pattern, such as the slit 11 as shown in FIG. 4, to be inclined by moving handle 19 away from the vertical, thus to align it with the arm, hand and object sequence of pictorial material.

The body of the lighting unit and essentially all other items of structure are typically formed from aluminum, this metal being light, workable and a good conductor of heat. Handle 19 is likewise formed of aluminum, but with a heat-resisting polyethylene plastic coating to allow it to be handled with the fingers while the lighting unit is in operation.

In addition to the effects pattern an effects screen is provided to give color to the light from a unit when this is desired. In FIG. 3 the effects screen is shown at 21, being placed in slot 22. In FIG. 4 this screen is indicated at 23 by the inclined sectioning lines, which signify the color green in this instance. The screens are formed of tinted gelatins 23, which are available to the lighting trade. The gelatins are attached to rings 21 in each case so that a selection of colors is available for being substitutionally employed.

To provide a "soft" or diffused light a relatively fine mesh screen is substituted for a gelatin on a ring 21. Heat insulated handles 24 are provided for rings 21 in the same way as previously described for handle 19. Particularly with the gelatins, the rings 21 are inserted in slot 22 so as to be forward of the pattern element. This reduces the heat load upon the gelatin and prolongs its life.

The body 18 of the lighting unit is provided with a number of ventilation holes 26 in the vicinity of lamp 15. Light is prevented from escaping through these holes by a ventilator cover 27. This has the form of a ring having an internal diameter greater than the external diameter of body 18. It is fastened to the body by means of an inner ring bearing upon the body at the left end of cover 27 as it is shown in FIG. 3.

A heat-insulating knob 28 is attached at the extreme left end of the lighting unit, to the exterior of reflector 12. The knob is of aluminum with an outer coating of polyethylene plastic. It is used toward the area of the pictorial subject matter; that is, to direct the lighting unit thereto, for the illumination thereof. It will be understood that because the size of body 18 is relatively small the temperature of the same during continued operation becomes greater than is comfortable to the fingers of the operator in setting up the exhibit. The elevated temperature of the body; however, provides efficient radiation of heat. The outer surfaces of elements 18, 27, etc. are normally dull gold anodized for aesthetic reasons. This gives a reasonable approximation to a black body from the standpoint of heat radiation.

Body 18 is supported by hanger 30, which latter has an inverted U shape. The depth of the U (vertically) is made sufficient so that the lighting unit can be tilted nearly 180° within it. This is to make it possible to reach any part of pictorial material. In FIG. 2 this is illustrated in a relatively normal manner. Lighting unit 5 is tilted fairly near the vertical while lighting unit 6 is tilted only 30° downward from the horizontal. Threaded and knurled thumbscrews 31 pass through each extremity of the U and thread into body 18. These are fitted to hold this body at any inclination upon being tightened.

The hanger, in turn, is attached to arm 7 by a close threaded nipple 32, which is threaded into both the arm and the hanger. This permits 360° rotation in the horizontal plane. The nipple is hollow and a two wire electrical conductor 33 known in the trade as a "zip cord" passes from socket 16, through body 18, through nipple 32 and into hollow arm 7. This provides essentially a covered run for the electrical cord, thus adding to the neatness of the installation. Further, this cord passes from bar 7 to extension bracket 8 and through this hollow cylindrical element to the rear of the picture, etc., where it is further out of sight.

Extension bracket 8 has an inner extension 34, which slides in and out of hollow cylindrical part 8. The adjustment chosen for any application is fixed by tightening thumbscrew 35. This screw threads through part 8 and bears upon part 34 when tightened. A plate 39 is rigidly fastened to the rear extremity of part 8. The plate has plural holes through which plural screws fasten it, and thus the whole installation, to the rear of the picture frame or equivalent.

I usually prefer to supply a shield 36, which is formed to remove individual units 4, 5, 6, etc. largely or completely from view and yet not restrict the adjustment of any of these units to illuminate any part of the pictorial material. This shield is shown dotted in FIGS. 1 and 2. It is formed having a top, a front and two ends, typically employing aluminum as the material and having a dull gold anodizing finish. The bottom and the rear surfaces are absent so that the beams of light from the lighting units proceed to the pictorial material on surface 1 without obstruction. The shield is fastened to bar 7 by holes at the top of each end of the shield through which knurled-headed screws fasten the same to spring-fingered buttons, which push into the hollow ends of bar 7. The screws are 37 and the buttons 38 in FIG. 1. This provides a way of removing or attaching the shield, and when the buttons are removed, of checking or replacing the wiring 33. The buttons are tapped to receive the thumb screws. The buttons also provide an ornamental finish to the bar 7.

In contradistinction to possible prior art, the three lighting units that have been shown in FIG. 1 constitute a typical installation according to this invention. It will be understood that two lighting units may instead be used, as 4 and 5, and bar 7 can then be shortened. Conversely, four units may be employed and the bar lengthened. A typical spacing between units is 4 inches, but this dimension and the number of units employed may be altered as required to accommodate specific installations that are unusual.

The proportions of the several elements of my invention shown in FIGS. 1 and 2 apply to the usual painting, etc. having a major dimension of several feet. For such, the focal length of lens 14 is preferably 4¾ inches (90 mm.). It will be understood that these proportions may be altered and also the focal length of the lens. However, by employing effect patterns 10 with apertures of appropriate size I am able to provide accent illumination over large or small areas at various locations on canvases of various sizes.

When desirable, my whole assembly of lighting units, bar and extension can be placed at the bottom or at the side of pictorial material. This does not require reconstruction of the assembly, but merely that it be installed upside down or on its side with respect to the showing of FIGS. 1 and 2.

The terms "pictorial" and "artistic" as applied to subject matter discussed herein are to be given broad interpretation. To emphasize by controlled illumination a single uniform area of a modernistic rendition is to be included.

Although this invention has been described in its preferred form with a certain degree of particularity, it is to be understood that this disclosure of the preferred form has been made only by way of example, and that various changes in the details of construction and in the combination and arrangement of parts may be made without departing from the spirit and scope of the invention as claimed below.

Having thus fully described by invention and the manner in which it is to be practiced, I claim:

1. Means for illuminating artistic subject matter comprising;
    (a) plural lighting units, each having
        optical means to direct a beam of light toward a separate part of said subject matter, and
        selectively employable means to vignette each said beam according to a geometrical shape,
    (b) an elongated bar member supporting said plural lighting units,
    (c) an extension means to support said bar member away from said artistic subject matter,
    (d) a shield partially enclosing said lighting units to remove the same from view while allowing light beams from said lighting units to proceed without obstruction to said artistic subject matter, and
    (e) means to removably attach the ends of said shield to the ends of said bar member.

2. Means for illuminating artistic subject matter comprising;
    (a) plural externally identical lighting units, each having
        optical means to direct a beam of light exclusively toward a separate small part of said subject matter, and
        selectively employable unitary means to constantly vignette each said beam according to a geometrical shape,
    (b) a single elongated bar member directly supporting each of said plural lighting units, and
    (c) an extension means to adjustably support said bar member perpendicularly away from said artistic subject matter.

3. The means for illumination of claim 2 in which each lighting unit includes;
   (a) a first single slot disposed out of the focal plane of said optical means and formed to allow orientation of said vignetting means by rotation thereof in said first slot.

4. The means for illumination of claim 3 in which each lighting unit additionally includes;
   (a) only one single-piece light-coloring means wholly substitutionally insertable within a second single slot disposed away from the source of said beam of light with respect to said first slot in said lighting unit to color that portion of said beam of light which passes said vignetting means.

References Cited by the Examiner

UNITED STATES PATENTS

| | | | |
|---|---|---|---|
| 1,764,834 | 6/1930 | Gatliff | 40—125 X |
| 1,766,637 | 6/1930 | Hopewell | 240—3.1 |
| 1,916,567 | 7/1933 | Grant | 88—24 |
| 2,231,719 | 2/1941 | Hughey | 240—3.1 |
| 2,325,569 | 7/1943 | Hancock et al. | |
| 2,950,382 | 8/1960 | Hatch | 240—3.1 |
| 2,957,389 | 10/1960 | Moore | 240—41 X |
| 3,127,114 | 3/1964 | Shaw | 240—4 |

NORTON ANSHER, *Primary Examiner.*

J. F. PETERS, *Assistant Examiner.*